Oct. 17, 1967 J. R. BRAY 3,348,063
SOLID STATE A-C CONTACTOR WITH MOMENTARY START-STOP BUTTONS
Filed Sept. 16, 1963
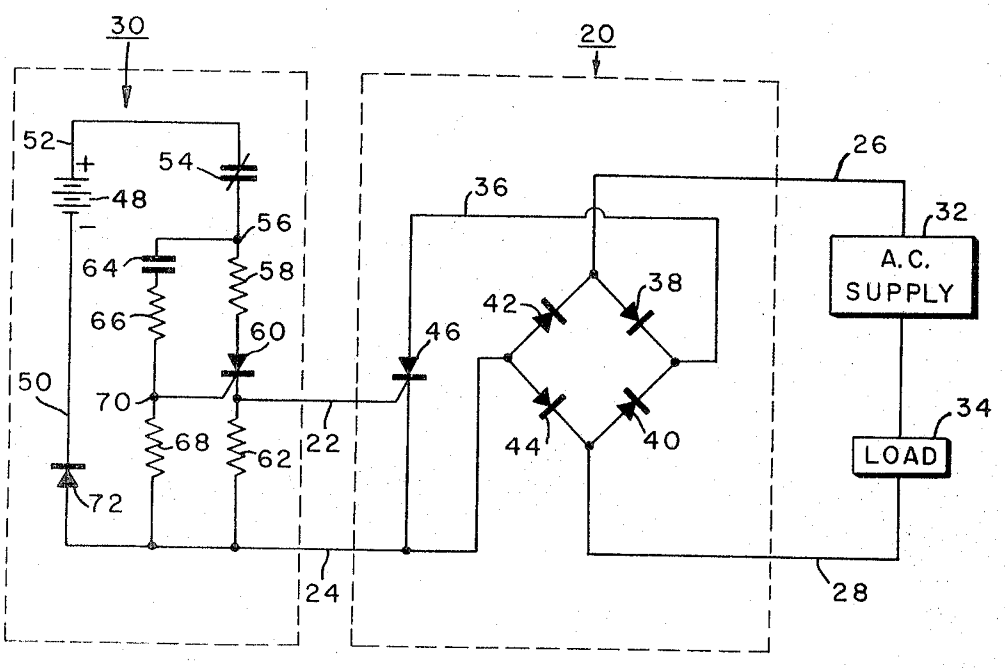
INVENTOR
JOHN R. BRAY
BY Kelly O. Corley
ATTORNEY United States Patent Office 3,348,063

Patented Oct. 17, 1967

3,348,063
SOLID STATE A-C CONTACTOR WITH MOMENTARY START-STOP BUTTONS

John R. Bray, Pensacola, Fla., assignor to Monsanto Company, a corporation of Delaware Filed Sept. 16, 1963, Ser. No. 309,249
4 Claims. (Cl. 307—88.5)

The present invention relates to a solid state alternating current switch or contactor having wide utility as a replacement for conventional switches and relays.

In operations where electrical contacts or switches are required to operate frequently, particularly where substantial currents are carried, contact burning and mechanical wear pose severe problems. It is impractical to use mechanical contactors or switches in many applications involving carrying of large amperages, particularly when the circuit must be opened and closed at short intervals. In addition, mechanical switches produce arcing at the contacts, which may be unacceptable for example in an explosive environment.

A primary object of the invention is to provide a switch or contactor which is not subject to mechanical wear.

A further object is to provide a switch of the above character in which arcing and burning of contact points is eliminated.

A further object is to provide a switch of the above character which is operable to close and open an AC circuit at very high repetition rates.

A further object is to provide a switch of the above character which is efficient and reliable.

A further object is to provide a switch of the above character which is compact and which occupies a minimum of physical space as compared to mechanical switches capable of carrying the same current loads.

A further object is to provide a switch of the above character which is adapted for either manual control or to respond to an electrical signal so as to function as a relay.

Other objects of the invention will in part be obvious and will in part appear hereinafter.

The invention accordingly comprises the electronic circuits, combinations of elements and circuit relationships which will be exemplified in the circuit hereinafter set forth, and the scope of the invention will be indicated in the claims.

For a more complete understanding of the nature and objects of the invention, reference should be made to the following detailed description taken in connection with the accompanying drawing, in which the single figure is a schematic circuit diagram of an exemplary electronic switch according to the invention.

Referring now generally to the drawing, a switch circuit 20 according to the present invention has a pair of control conductors 22 and 24 and a pair of output conductors 26 and 28. As will be more fully explained, switch circuit 20 is electrically controlled, in response to appropriate signals applied to control conductors 22 and 24, to establish a condition of either low impedance or high impedance between conductors 26 and 28. A preferred embodiment of a manually actuated signal source 30 is illustrated for providing the required electrical control signal on conductors 22 and 24, and a schematically illustrated AC power supply 32 has one of its output conductors connected to conductor 26, its remaining output conductor being connected through a load impedance 34 to output conductor 28. It may be seen that when the impedance between conductors 26 and 28 is high, a minimum of current will be supplied to load 34, corresponding to an "open" switch. On the other hand, when the impedance appearing between conductors 26 and 28 is low, a maximum amount of current will be supplied to load 34, corresponding to a "closed" switch.

Switch circuit 20 includes four rectifying diodes arranged in a bridge circuit, the first or output diagonal of which is connected to load conductors 26 and 28 and a second or control diagonal of which is connected to conductors 24 and 36. Diodes 38 and 40 have their anodes connected respectively to conductors 26 and 28 and their cathodes connected in common to conductor 36, while diodes 42 and 44 have their cathodes connected respectively to conductors 26 and 28 and their anodes connected in common to conductor 24. An electrically controlled switch means, illustrated as a silicon controlled rectifier 46, completes the switch circuit 20. Rectifier 46 is connected across the second diagonal with its anode connected to conductor 36 and its cathode connected to conductor 24. The gate electrode of rectifier 46 is connected to control conductor 22 so that a positive polarity input control signal may be applied to the gate electrode with respect to the cathode electrode, thus rendering rectifier 46 conductive.

Switch circuit 20 as thus constituted is enabled to transmit full wave alternating current between its output conductors 26 and 28 when the appropriate control signal noted above is applied to input conductors 22 and 24. Assuming that rectifier 46 has been rendered conductive by the presence of a suitable control signal applied to conductors 22 and 24, during the power supply half cycles in which a positive potential appears on power supply conductor 26, electrons flow in series through load 34, diode 44, silicon controlled rectifier 46 and diode 38 to conductor 26. When conductor 26 is negative with respect to conductor 28, electrons flow in series through diode 42, rectifier 46, diode 40 through load 34 to the remaining power supply conductor. Full wave alternating current is thus supplied to load 34 whenever rectifier 46 is held conductive by the appropriate control signal. When rectifier 46 is non-conductive, switch circuit 20 acts as an open switch, presenting extremely high impedance in series with the load 34.

Signal source 30 includes a DC power supply 48 having its negative conductor 50 connected to conductor 24 and its positive conductor 52 connected through normally closed manual switch 54 to terminal 56. A series circuit, including resistor 58, silicon controlled rectifier 60, and resistor 62, connects terminal 56 to conductor 24. A normally open manual switch 64 is connected in series with resistors 66 and 68 between terminal 56 and conductor 24. The gate electrode of rectifier 60 is connected to the terminal 70 between resistors 66 and 68. Control conductor 22 is connected to the cathode of rectifier 60 so that the potential appearing across resistor 62 when rectifier 60 conducts is applied to the gate and cathode electrodes of rectifier 46.

In order to turn switch circuit 20 "on" so that alternating current may be supplied to load 34, manual switch 64 may be momentarily closed. This supplies current to the voltage divider comprising resistors 66 and 68, which have their values selected so that the resulting signal then appearing across resistor 68 is sufficient to trigger rectifier 60 into conduction. As is known to those skilled in the art, once rectifier 60 has been thus triggered into conduction, it will continue to conduct so long as anode to cathode potential is applied, even though the gate to cathode triggering potential is removed. Thus rectifier 60 remains conductive after switch 64 opens until switch 54 is actuated to interrupt current flow through rectifier 60. It should be noted that since the current through the anode to cathode circuit of rectifier 46 decreases to zero each half cycle of the AC power supply 32, rectifier 46 will revert to the non-conducting state within a half cycle after switch 54 is actuated and rectifier 60 ceases conduction.

If several signal sources 30 are supplied in parallel from a common DC power supply 48, a separate forwardly biased diode 72 may be inserted between each of the sources 30 and the common power supply in order to isolate each of the signal sources 30 from transients originating in the remaining signal circuits.

While ordinary skill in the art would permit selection of suitable component values, the following are given way of example only:

| | | |
|---|---|---|
| Resistor 58 | kilohms | 1.2 |
| Resistor 62 | do | 1 |
| Resistor 66 | do | 1 |
| Resistor 68 | ohms | 560 |

These values are suitable when used with a 25-volt DC power supply 48 and a small low-current silicon controlled rectifier 60. Rectifier 46 may be of the large power variety since it must carry the full current supplied to load 34. Diodes 38, 40, 42, 44 and 72 may be Type 1N2513. Although it would be possible to substitute other types of electrically controlled switching devices for the silicon controlled rectifiers 46 and 60, such as thyratron tubes or silicon controlled switches, silicon controlled rectifiers are preferred.

It may be seen from the above description and the accompanying drawing that there has ben provided a switch or contactor which is not subject to mechanical wear or arcing such as occurs with conventional mechanical switches. The switch according to the present invention is operable to open or close an AC circuit carrying substantial current at very high repetition rates. The switch is highly efficient and, when it incorporates a silicon controlled rectifier in the diode bridge control diagonal, has all the normal advantages of solid state circuitry such as reliability, economy and compact size. The switching circuit is adapted to be controlled either manually or to respond to an electrical signal so as to function as a relay.

It will thus be seen that the objects set forth above, among those made apparent from the preceding description, are efficiently attained and, since certain changes may be made in the above circuitry without departing from the scope of the invention, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention, which, as a matter of language, might be said to fall therebetween.

Having described my invention, what I claim as new and desire to secure by Letters Patent is:

1. AC switching apparatus comprising in combination:
(a) a first diode having an anode connected to a first conductor and a cathode connected to a second conductor,
(b) a second diode having its cathode connected to said second conductor and its anode connected to a third conductor,
(c) a third diode having its cathode connected to said third conductor and its anode connected to a fourth conductor,
(d) a fourth diode having its anode connected to said fourth conductor and its cathode connected to said first conductor,
(e) an AC power supply connected in series with a load impedance across said first and third conductors,
(f) a first silicon controlled rectifier having a first anode connected to said second conductor, a first cathode connected to said fourth conductor, and a first gate electrode,
(g) and manual signal generating means for selectively applying a triggering potential between said first gate and said first cathode electrodes, said signal generating means including:
(1) a second silicon controlled rectifier having a second anode, a second cathode and a second gate electrode,
(2) a DC power supply having positive and negative terminals,
(3) means including a normally closed switch and a resistance connected in series with said DC power supply and the anode-to-cathode circuit of said second silicon controlled rectifier,
(4) circuit means including a normally open switch and an impedance connected between said positive terminal of said DC power supply and said second gate electrode,
(5) and means for applying the potential appearing across said resistance to said gate and cathode electrodes of said first silicon controlled rectifier.

2. AC switching apparatus, comprising in combination:
(a) a first silicon controlled rectifier having a first gate electrode, a first anode electrode, and a first cathode electrode,
(b) a second silicon controlled rectifier having a second gate electrode, a second anode electrode, and a second cathode electrode,
(c) means connecting an AC source and a load impedance in series with said first anode and said first cathode,
(d) means defining a series circuit including a DC source, a load resistance, and said second cathode and said second anode, said DC source being poled to apply a positive potential to said second anode,
(e) means applying a positive pulse to said second gate, whereby said second rectifier conducts and a DC voltage is developed across said load resistor,
(f) means directly connecting the more positive end of said load resistor to said first gate,
(g) and means directly connecting the more negative end of said said resistor to said first cathode.

3. AC switching apparatus, comprising in combination:
(a) a first silicon controlled rectifier having a first gate electrode, a first anode electrode, and a first cathode electrode,
(b) a second silicon controlled rectifier having a second gate electrode, a second anode electrode, and a second cathode electrode,
(c) a load resistor having one end directly connected to said second cathode and said first gate, and having its opposite end directly connected to said first cathode,
(d) means connecting the positive terminal of a DC source to said second anode, and connecting the negative terminal of said DC source to said first cathode,
(e) means including a load impedance connecting an AC source in series with said anode and cathode electrodes of said first rectifier,
(f) and means applying to said second gate a pulse sufficiently positive with respect to said second cathode to trigger said second rectifier into conduction, whereby the direct current voltage developed across said load resistance triggers said first silicon controlled rectifier into conduction.

4. Switching apparatus comprising in combination:
(a) a silicon controlled rectifier having anode, cathode, and gate electrodes,
(b) a DC power supply having positive and negative terminals,
(c) means including a forwardly biased diode connecting said supply terminals to positive and negative supply conductors,
(d) a first series circuit connected between said positive and negative supply conductors, said first series circuit including:

(1) a normally closed switch,
(2) a load resistor, and
(3) the anode to cathode path of said rectifier, said rectifier being poled so that the anode electrode is connected to a more positive point in said series circuit than said cathode, (e) and a second series circuit connected between said positive and negative supply conductors, said second series circuit including:
(1) a second resistor,
(2) a normally open switch,
(3) said normally closed switch, and
(4) the gate-to-cathode path of said rectifier.

References Cited

UNITED STATES PATENTS

| | | | |
|---|---|---|---|
| 3,037,158 | 5/1962 | Schmidt | 307—88.5 |
| 3,139,143 | 6/1964 | Renda | 307—88.5 |
| 3,161,759 | 12/1964 | Gambill et al. | 307—88.5 |
| 3,210,605 | 10/1965 | Jones | 307—88.5 |
| 3,242,346 | 3/1966 | Skoubo | 307—88.5 |

OTHER REFERENCES

Pub. I "Turn-off Circuits for Controlled Rectifiers," by Jones. Electronics, Aug. 5, 1960, vol. 33, No. 32, pp. 52–55.

Pub. II "Static Contactor Using a Trinistor," solid state design application note, February 1962, pp. 44 and 45.

ARTHUR GAUSS, *Primary Examiner.*

R. H. EPSTEIN, *Assistant Examiner.*